United States Patent
Weiss et al.

(10) Patent No.: US 6,676,204 B2
(45) Date of Patent: Jan. 13, 2004

(54) VEHICLE ROOF

(75) Inventors: Edgar Weiss, Alzenau (DE); Holger Oechel, Frankfurt am Main (DE); Bardo Imgram, Seligenstadt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/238,426

(22) Filed: Sep. 10, 2002

(65) Prior Publication Data

US 2003/0047966 A1 Mar. 13, 2003

(30) Foreign Application Priority Data

Sep. 12, 2001 (DE) .......................... 101 44 899

(51) Int. Cl.[7] ............................... B60J 7/043
(52) U.S. Cl. ....................................... 296/214
(58) Field of Search ......................... 296/214

(56) References Cited

U.S. PATENT DOCUMENTS 4,679,846 A * 7/1987 Lux et al. .................... 296/214
6,309,013 B1 * 10/2001 Staltmayer et al. ......... 296/214

FOREIGN PATENT DOCUMENTS

| DE | 81 07 603 | 8/1981 |
| DE | 31 05 717 | 9/1982 |
| DE | 195 13 971 | 10/1995 |
| DE | 4436941 C1 | 5/1996 |
| DE | 198 58 676 A1 | 6/2000 |
| DE | 19858676 A1 | 10/2001 |
| EP | 1 010 560 | 6/2000 |

OTHER PUBLICATIONS

European Search Report dated Feb. 3, 2003.
German Search Report dated May 12, 2003.

* cited by examiner

*Primary Examiner*—Dennis H. Pedder
(74) *Attorney, Agent, or Firm*—Carlson, Gaskey & Olds

(57) ABSTRACT

A vehicle roof comprises a roof opening, a cover which can be raised and is provided for closing the roof opening, and a cover liner which can be positioned underneath the cover. The vehicle roof further comprises a linkage provided between the cover and the cover liner, by which the cover and the cover liner can be coupled to each other during raising the cover and by which a rear edge of the cover liner is lifted during raising the cover. The linkage has a drag lever which swivels during raising the cover. The drag lever is supported in a swivel bearing on the side of the vehicle roof and has a first bearing for connection with the cover as well as a second bearing for connection with the cover liner. The swivel bearing on the side of the vehicle roof and in the raised state of the cover lies underneath the first bearing for connection with the cover and is mounted to a guide by means of which the swivel bearing on the side of the vehicle roof is moved upwards during raising the cover.

24 Claims, 4 Drawing Sheets

VEHICLE ROOF

This application claims priority to German patent application number 101 44 899.6 filed Sep. 12, 2001.

BACKGROUND OF THE INVENTION

The invention relates to a vehicle roof.

A conventional vehicle roof comprises a roof opening, a cover which can be raised and which is provided for closing the roof opening, a cover liner which can be positioned underneath the cover, and a linkage between the cover and the cover liner, by which the cover and the cover liner can be coupled to each other during raising the cover and by which a rear edge of the cover liner is lifted during raising the cover. The linkage has a drag lever which swivels during raising the cover. The drag lever is supported in a swivel bearing on the side of the vehicle roof and has a first bearing for connection with the cover as well as a second bearing for connection with the cover liner.

Such a vehicle roof is known from German Utility Model 87 03 996. In this vehicle roof the drag lever is a two-armed lever which is connected at one end with the cover liner and at the other end with a tension spring that is supported on the side of the vehicle roof. A bearing lever which is mounted to the cover engages between the ends of the two-armed lever. During raising the cover, also the rear edge of the cover liner is entrained via the linkage. During raising, the linkage is folded so as to be flat whereby it is effected that the cover liner is raised to a greater extent than the cover itself, and a large ventilation opening at the rear edge of the cover and the cover liner is achieved in the raised state. A similar vehicle roof is known from DE 198 58 676 A1.

The invention provides a vehicle roof in which the linkage is made very compact and has small dimensions, above all in the longitudinal extension; nevertheless, a large raising angle is made possible both for the cover and the cover liner.

SUMMARY OF THE INVENTION

According to the invention, a vehicle roof comprises a roof opening, a cover which can be raised and which is provided for closing the roof opening, and a cover liner which can be positioned underneath the cover. The vehicle roof further comprises a linkage between the cover and the cover liner, by which the cover and the cover liner can be coupled to each other during raising the cover and by which a rear edge of the cover liner is lifted during raising the cover. The linkage has a drag lever which swivels during raising the cover. The drag lever is supported in a swivel bearing on the side of the vehicle roof and has a first bearing for connection with the cover as well as a second bearing for connection with the cover liner. The swivel bearing on the side of the vehicle roof and in the raised state of the cover lies underneath the first bearing for connection with the cover and is mounted to a guide by means of which the swivel bearing on the side of the vehicle roof is moved upwards during raising the cover. In the vehicle roof according to the invention, the drag lever is swiveled upwards such that the swivel bearing lies underneath the bearing to the cover. Due to the fact that the swivel bearing itself is not stationary, but for its part is moved upwards by means of the guide during the raising operation, the swivel displacement of the drag lever (which displacement is dependent on the length of the drag lever) and the displacement in height of its swivel bearing will sum up—for the extent of the raising motion—to give the overall raising extent of the rear edge of the cover. As compared with the linkage disclosed in DE 198 58 676 A1, in which the swivel bearing is rigidly mounted to a carriage that is not adjustable in height, the drag lever in the vehicle roof according to the invention can be configured shorter for achieving the same raising extent, so that the linkage becomes more compact all in all. The term "underneath" states that the swivel bearing is not reaching the vertical level of the first bearing.

According to the preferred embodiment, there is provided a roof-fixed longitudinal guide for horizontally shifting the cover. Further, a movable carriage is provided guided in the longitudinal guide. In this arrangement, the guide is seated on the carriage and therefore is entrained during shifting the carriage. Usually, of course, there are mounted guides including carriages to both sides of the cover.

In the preferred embodiment the guide is a pivoting bearing lever, i.e. a simple and compact component.

The bearing lever can be, on the one hand, pivotally coupled to the carriage and, on the other, coupled to the drag lever through the swivel bearing. The swivel bearing travels upwards along a circular path during raising the cover. It is due to this lever arrangement that the working point of the force on the cover can be located relatively simple far to the rear; this having an advantageous effect on the lifting forces, because these can be kept small due to the lever conditions that can be optimized more easily.

Preferably in the vicinity of the second bearing for connection with the cover liner, the drag lever has a stop by means of which it rests on the longitudinal guide when the cover is not raised. This embodiment is advantageous for several reasons. First, the longitudinal guide is a component which is aligned very precisely and determines the location of the cover, so that it can optimally serve as a stop for the end position, too. Further, the cover liner will not perform any vertical motions or only negligible ones, if the cover is lowered for shifting backwards (horizontal shifting), in order to be able to be shifted under the roof skin. The stop itself actually is not lowered during this lowering motion, and the point of articulation to the drag lever lies close to the stop that does not follow the downward motion.

As already mentioned, the stop may rest on the longitudinal guide e.g. when the cover is not raised and may define the position of the drag lever at least in one way; it likewise being possible that the stop rests on the longitudinal guide when the roof opening is closed and/or the cover has been shifted in horizontal direction. Therefore, the stop may also serve as a sliding guide during moving back the cover.

In case the drag lever is coupled to the cover by means of a connecting lever, this connecting lever being pivotally mounted to the drag lever on the one hand and being pivotally mounted to the cover on the other hand, then there will preferably be produced a three-piece linkage with levers arranged in series, of which the drag lever forms the one in the middle. Through providing the connecting lever it is once more possible to optimize the lifting forces, in addition to prevent a distorting of the systems thanks to the enhanced degree of freedom, and to achieve the desired motions of cover and cover liner in an easier way.

It is particularly of advantage in this context if the drag lever extends substantially in horizontal direction when the roof opening is closed, one of its ends being engaged by a bearing lever which extends obliquely downwards, and the other of its ends being engaged by the connecting lever which extends obliquely upwards. With this arrangement, there will be achieved a compact position of the linkage virtually folded together; however, no dead center situations being provided, because the bearing lever and the connecting lever do not extend in parallelism with the drag lever, but obliquely relative to it. The already explained locations of the levers relative to each other in the closed position also make it possible to lower the cover at its rear edge during shifting backwards. For this lowering motion, in fact the connecting lever, which anyway has an oblique orientation, has to be swiveled. In so doing, the motion of the drag lever can be very small.

There is preferably provided a one-way stop (acting only in one direction) which is connected with the cover and defines an angular position of the connecting lever relative to the cover when the cover is being raised. This is intended to cause that the connecting point of drag lever and connecting lever is lifted directly, if the cover is being raised. Due to the stop, it is only admitted that, during raising the cover, the connecting lever performs a small swiveling motion or no swiveling motion at all.

In the reverse direction during lowering the cover, in particular during lowering the rear edge of the cover from the closed position for horizontally shifting, the one-way stop does not have an effect, i.e. it does not define the angular position of the connecting lever relative to the cover.

As a connection between the drag lever and the cover liner there is preferably provided a slotted guide by which a distortion of the whole system is avoided and by which additional functions can be realized in a simple manner, which are explained in the following.

The slotted guide is preferably mounted to the cover liner, with a guide pin arranged on the drag lever being able to be disengaged from the slotted guide when the cover liner is shifted horizontally. That is why pushing back of the cover liner is allowed in a simple way, in particular when the roof opening is closed.

According to one design the slotted guide is formed by a C-shaped plastics part which has a protrusion for stopping the guide pin; this plastics part, for the purpose of disengaging the guide pin from the slotted guide, being able to be elastically deformed in such a manner that the guide pin can travel past the protrusion. This protrusion defines a desired and specific position of the cover liner which, however, can be left by a desired higher effort.

The slotted guide may further have an ascending portion by means of which the rear edge of the cover liner is lifted out of the closed position at the start of the horizontally shifting. In this embodiment the slotted guide has an additional function, i.e. it controlling the optionally provided vertical shifting of the cover for exposing the roof opening.

DETAILED DESCRIPTION OF THE PREFERRED EMBODIMENTS

Figure 1:
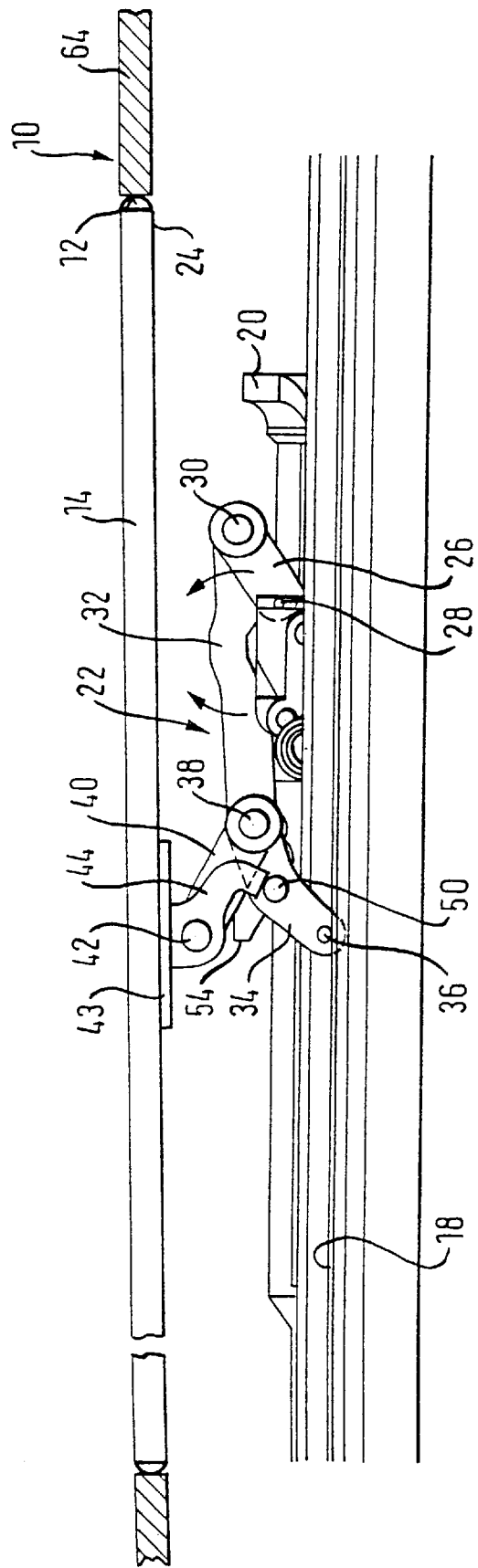
FIG. 1 shows a side view of the vehicle roof according to the invention, with the roof opening being closed.

In the Figures there is shown a vehicle roof 10, illustrated with a roof opening 12, which can be closed by a raisable cover 14. The cover is made of sheet metal, glass or any other material and may also be a support for solar cells.

In the vehicle interior space the vehicle roof is concealed by a vehicle roof liner, the region of the liner which conceals the cover being a separate, movable part, namely the so-called cover liner 16. The cover is shiftingly accommodated in a surrounding, vehicle-fixed frame that extends around the roof opening 12. Provided on the frame on the two lateral edges of the roof opening is one longitudinal guide 18 each, which is fixed to the roof or to the frame. A carriage 20, shiftable in the longitudinal direction preferably by a motor, is provided in each of the longitudinal guides 18. Electric motors and connecting elements such as non-buckling drive cables etc. which are coupled with the carriage 20 for the shifting thereof, are known and therefore omitted for the sake of simplification. The cover 14 is coupled to the cover liner 16 by a linkage 22 having several levers. The linkage 22, in turn, is secured to the carriage 20, so that the cover 14 and the cover liner 16 are coupled to the carriage 20. The carriage 20 together with the linkage 22 situated on it are arranged in the rear part (front and rear relate to the vehicular direction of motion) of the frame. The linkage 22 serves the purpose to raise the cover 14 and the cover liner 16, in order to make possible a ventilation of the vehicle interior space. This is achieved in that, above all, the rear edge 24 of the cover 14 is lifted. In the front part of the cover liner, the latter is supported by an own carriage in the longitudinal guides or by the front carriages of the cover.

The construction of the linkage will be explained in the following with reference to one side of the frame. A guide member, such as a bearing lever 26, is seated on the carriage 20, which lever is connected at one end (lower end with respect to the closed state shown in FIG. 1) via swivel bearing 28 with the carriage 20 and at its other end via a swivel bearing 30 with an end of an elongated drag lever 32. The drag lever 32 extends substantially horizontally in the closed state of the vehicle roof, whilst the bearing lever 26 extends in the closed state from the carriage 20 obliquely upwards to the swivel bearing 30. At its free end opposite the swivel bearing 30, the drag lever 32 has a portion 34 which is cranked obliquely downwards, at the lower end of which a stop 36 is secured which is realized in the form of a plastic-coated pin projecting laterally and acting downwardly. When the cover is not raised as well as when the cover 14 is pushed backwards and shifted horizontally, the stop 36 rests on the longitudinal guide 18.

In the region of its end opposite the swivel bearing 30, the drag lever 32 is coupled at a bearing, such as a swivel bearing 38, to a connecting lever 40 which, when the vehicle roof is closed, extends obliquely upwards as far as to a bearing, such as swivel bearing 42. The bearing 42 represents the coupling of the connecting lever 40 with the cover 14. Thus, the swivel bearing 38 is an indirect connecting point and bearing of the drag lever 32 with the cover 14. The swivel bearing 42 is formed in that a two-leg bearing block 43 is secured to the underside of the cover 14, the connecting lever 40 being received between the legs. One leg of the bearing block 43 has a protrusion 44 which extends in parallelism to the connecting lever 40 and in the direction towards the swivel bearing 38. At the end of the protrusion 44, there is provided a cranked stop 46 which (with reference to FIG. 1) extends into the drawings plane and which can rest between the swivel bearings 38, 42 on the lower edge of the connecting lever 40 and acts only in one direction.

At a distance further away than the swivel bearing 38 and as seen from the swivel bearing 30, there is provided a bearing for connecting the drag lever 32 with the cover liner. This bearing is formed by a guide pin 50 which is mounted to the drag lever 32 and extends into the plane of projection with reference to FIG. 1. The guide pin 50 is received in a slotted guide 52 which is open on one side and is formed by a C-shaped plastics part 54, which is rigidly secured to the upper side of the cover liner 16. In FIG. 1 there can only be seen an upper portion of the plastics part 54. In the vertical direction, the guide pin 50 is accommodated in the slotted guide 52 essentially so as to have no play therein, but in the horizontal direction the guide pin 50 is able to travel in the slotted guide 52. As can be taken from FIG. 1, the guide pin 50 is arranged in horizontal direction virtually immediately above the stop 36.

The linkage 22 has a short overall length and is compact, whilst nevertheless allowing a large raising extent of the cover 14 and the cover liner 18.

Figure 4:
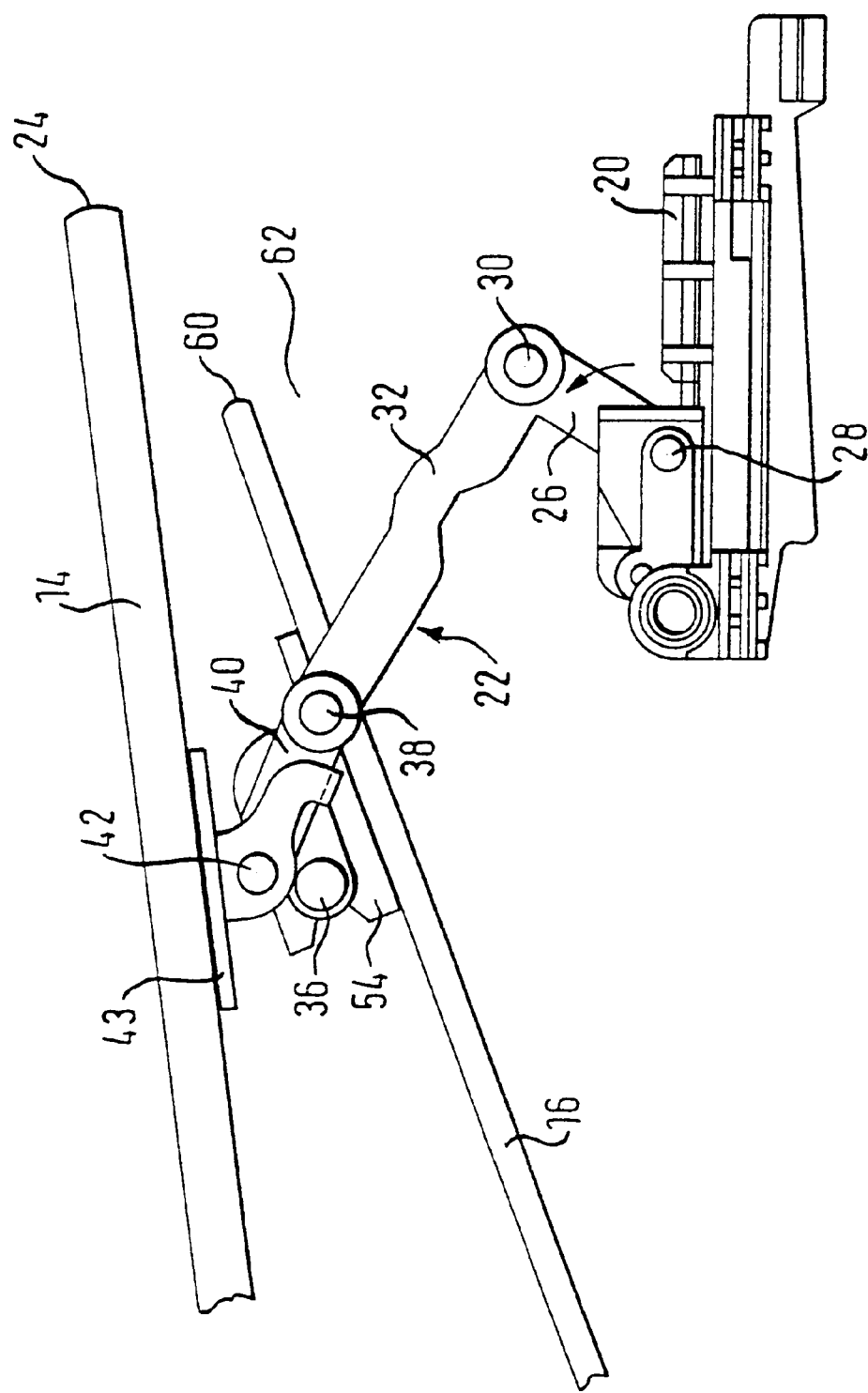
FIG. 4 shows a side view of the roof according to the invention, with the cover being raised.

Raising the cover 14 will be explained in the following in more detail. Such raising, i.e. inclining the cover 14, is effected by known drive devices (not shown); however, this could also be effected manually, of course. Simultaneously with lifting the rear edge of the cover 24, the bearing block 43 and the swivel bearing 42 will be lifted, too. During lifting, the angular position of the connecting lever 40 relative to the cover 14 will be defined by the stop 44 which acts during raising the cover 14. Through this, also the swivel bearing 38 will be lifted simultaneously with the raising of the cover 14. Thereby the drag lever 32 is swiveled upwards in the direction of the arrow and about the bearing 30. At the end of the raising motion, additionally the bearing lever 26 will be swiveled upwards, as can be seen in FIG. 4. Thus, the swivel bearing 30 is moved upwards along a circular arc during raising the cover 14, the bearing lever 26 forming the guidance for the swivel bearing 30 on this circular arc. It will be appreciated that the extent of raising (rising height) would be smaller without the bearing lever 26.

Figure 2:
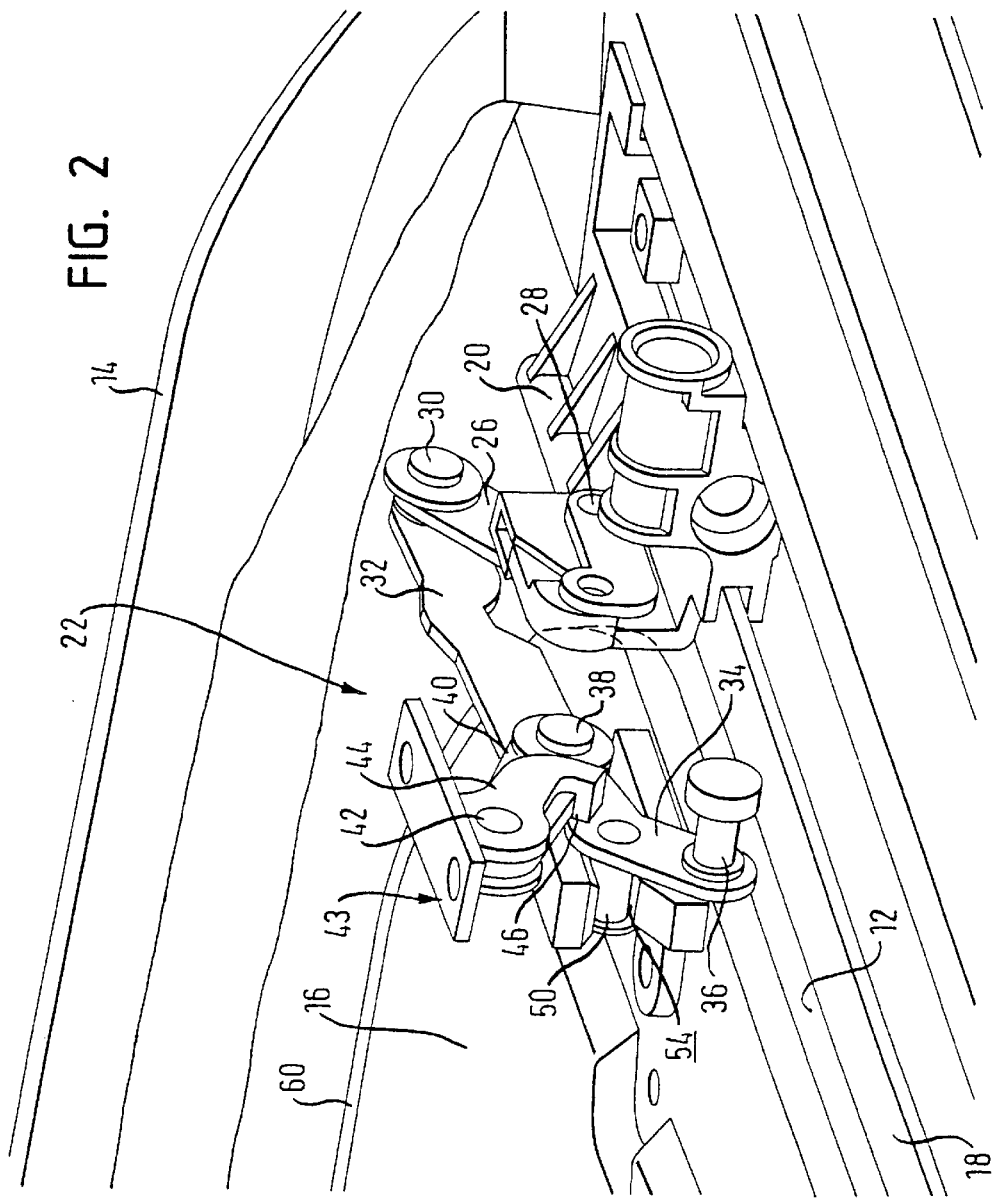
FIG. 2 shows a perspective view of the roof according to the invention from obliquely outside the vehicle, with the roof opening being closed and the cover partially cut open.

During raising the cover 14, the cover liner 16 is coupled to the drag lever 32, so that the cover liner 16 will likewise be raised. During this raising motion, the guide pin 50 is allowed to travel slightly within the slotted guide 52, which is required for the system not becoming kinematically overdetermined and distorted. The fact that the guide pin 50 is provided at a larger distance away from the swivel bearing 30 than is the swivel bearing 38 results in a sort of transmission for the raising motions of the cover 14 and the cover liner 16; i.e. the rear edge 60 of the cover liner 16 has come closer to the underside of the cover 14 with the raising motion as compared with the distance of the rear edge 60 to the underside of the cover 14 with the roof opening being closed (see FIGS. 1 to 3). Thereby the ventilation opening 62 can be made very large. During the subsequent lowering of the cover 14 from the raised position the stop 46 will have no effect. The levers 26, 32 and 40, however, will be swiveled towards each other during lowering, until they reach the locations shown in FIG. 1, and the stop 36 rests on the longitudinal guide 18.

The cover 14 can also be shifted to the rear (to the right with reference to FIG. 1) underneath the adjoining stationary roof skin 64 in the horizontal direction. For this purpose, however, the rear edge 24 has to be lowered first. This is done manually or, preferably, motor driven. The three-lever linkage 22 allows this lowering of the rear edge 24 by the bearing lever 26 being swiveled clockwise about the swivel bearing 28, and the connecting lever 40 being slightly swiveled anti-clockwise about the swivel bearing 38. With this motion, the stop 46 moves away from the connecting lever 40 and has no effect. Due to the guide pin 50 being arranged very close to the stop 36 and the latter resting on the longitudinal guide 18, the guide pin 50 will almost not at all move vertically during lowering the rear edge 24, so that the cover liner 16 remains stationary for the vehicle occupant.

Figure 3:
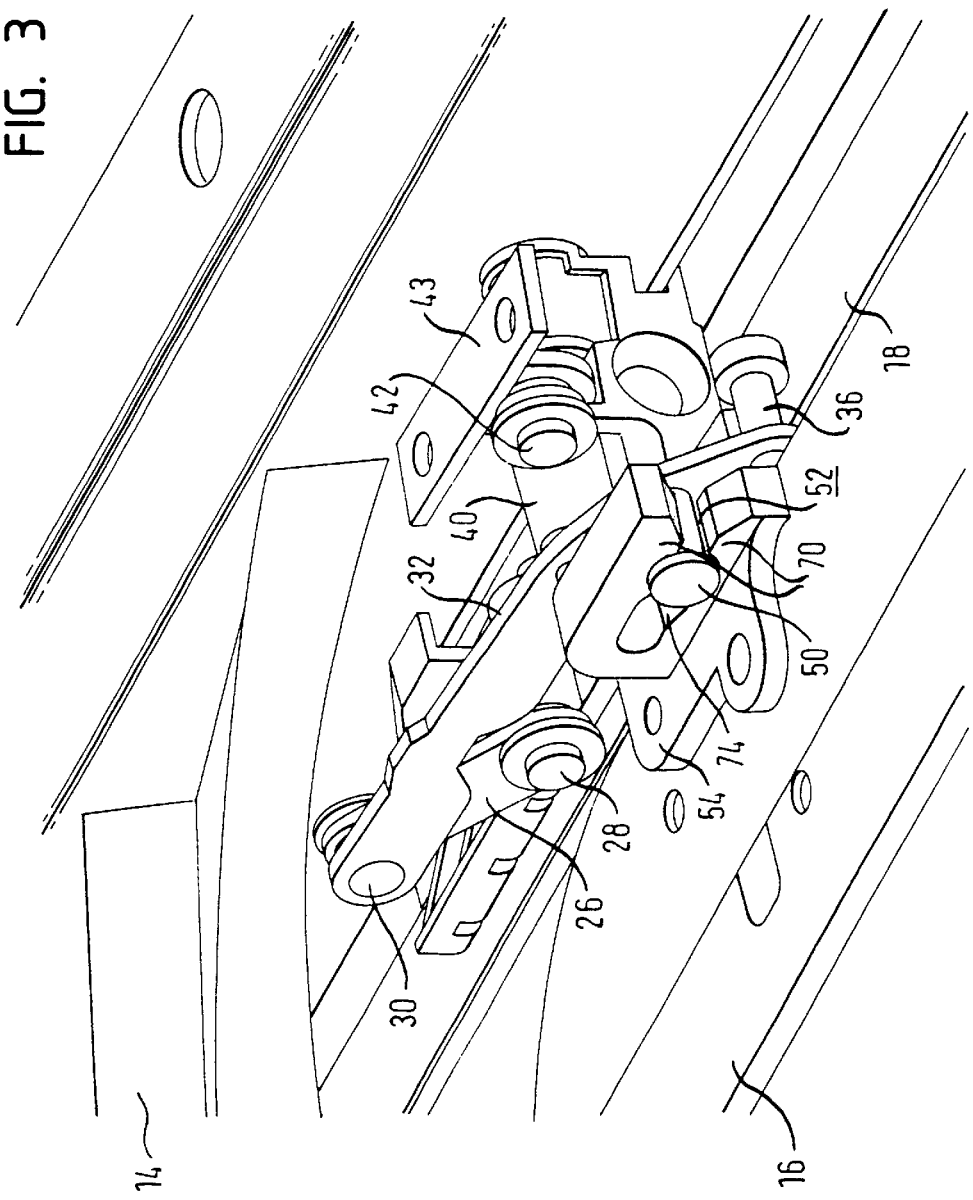
FIG. 3 shows a perspective view of the vehicle roof according to the invention, with the roof opening being closed and as seen from above the roof opening, the cover being partially cut open.

In FIG. 3 there is to be seen that the slotted guide 52 is not formed by a slot extending straight, it rather having obliquely extending portions.

In FIG. 3 there is shown that at the open end of the slotted guide 52, the elastic plastics part 54 has protrusions 70 projecting into the slotted guide 52 from the top and from the bottom, these protrusions acting as a stop for the guide pin 50. During insertion of the guide pin 50 the elastic plastics part 54 will elastically yield, until the guide pin 50 can travel along the protrusions 70.

If, at option, the cover liner 16 can be pushed backwards horizontally to the rear, then the guide pin 50 is shifted along the slotted guide 52. In this arrangement, the slotted guide 52 has an ascending portion 74. When the guide pin 50 glides along the ascending portion 74, the cover liner 16 is slightly lifted at its rear edge 60, in order to be able to glide past the adjoining stationary edge of the vehicle roof liner. In the further course of the shifting motion, the guide pin 50 can disengage from the slotted guide 52 in that the plastics part 54 yields when the protrusions 70 are reached and allows a traveling of the guide pin 50 past the protrusions 70.

As shown in the raised state in FIG. 4, the swivel bearing 30 is positioned underneath the bearing for connection with the cover, i.e. underneath the horizontal plane of the swivel bearing 38.

For the rest, there is no need that the entire cover liner 16 is configured to be raisable; it is sufficient, for instance, as is already indicated in FIG. 4, that only a rear portion of the cover liner, for instance the rear third of the cover liner, is configured so as to be able to swivel upwards and the remaining part of the cover liner stays positioned horizontally during raising.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle roof, comprising
 a roof opening;
 a cover which can be raised and that can be arranged to close said roof opening;
 a cover liner positioned underneath said cover;
 a linkage between said cover and said cover liner to couple said cover and said cover liner during raising said cover, and by which a rear edge of said cover liner is lifted during raising said cover, said linkage having
  a drag lever which swivels during raising of said cover,
  a swivel bearing that supports the drag lever at its lower end on a side of said vehicle roof, and
  a first bearing for connection with said cover and a second bearing for connection with said cover liner, and a guide which moves said swivel bearing on the side of said vehicle roof upwards during raising said cover, wherein the swivel bearing lies below said first and second bearings when the cover is in a raised state.

2. The vehicle roof according to claim 1, further comprising a roof-fixed longitudinal guide for horizontally shifting said cover and a movable carriage, said movable carriage being guided in said longitudinal guide, wherein said guide for said swivel bearing is seated on said carriage.

3. The vehicle roof according to claim 1, wherein said guide for said swivel bearing is a bearing lever.

4. The vehicle roof according to claim 3, further comprising a roof-fixed longitudinal guide for horizontally shifting said cover and a movable carriage, said movable carriage being guided in said longitudinal guide, wherein the bearing lever is seated on said carriage and pivotally coupled to said carriage and is coupled to said drag lever through said swivel bearing.

5. The vehicle roof according to claim 2, wherein a stop is provided on said drag lever proximate to said second bearing for connection with said cover liner, wherein said stop rests on said longitudinal guide when said roof opening is closed.

6. The vehicle roof according to claim 5, wherein said stop rests on said longitudinal guide when said cover is in a closed position closing said roof opening.

7. The vehicle roof according to claim 1, wherein said drag lever is coupled to said cover by a connecting lever that is pivotally mounted to said drag lever by said first bearing and pivotally mounted to said cover.

8. The vehicle roof according to claim 7, wherein said drag lever has two ends and extends substantially in horizontal direction when said roof opening is closed, one of said ends being engaged by a bearing lever which extends obliquely downwards, and the other of said two ends being engaged by said connecting lever which extends obliquely upwards.

9. The vehicle roof according to claim 7, wherein a one-way stop is provided which is connected with said cover and defines an angular position of said connecting lever relative to said cover when said cover is raised.

10. The vehicle roof according to claim 1, wherein said linkage of said drag lever and said cover liner is formed by a slotted guide.

11. The vehicle roof according to claim 10, wherein said slotted guide is mounted to said cover liner and further comprising a guide pin which is disengageable from said slotted guide when said cover liner is shifted.

12. The vehicle roof according to claim 10, wherein said slotted guide is formed by a C-shaped part which has a protrusion for stopping said guide pin, and wherein said C-shaped part is elastically deformable such that said guide pin can travel past said protrusion.

13. The vehicle roof according to claim 10, wherein said slotted guide has an ascending portion which lifts said rear edge of said cover liner out of said closed position when said cover begins horizontally shifting.

14. The vehicle roof according to claim 2, wherein a stop is provided on said drag lever proximate to said second bearing for connection with said cover liner, wherein said stop rests on said longitudinal guide when said cover is horizontally shifted.

15. A vehicle roof, comprising:
a roof opening;
a cover which can be raised and that can be arranged to close said roof opening;
a cover liner positioned underneath said cover; and
a linkage between said cover and said cover liner to couple said cover and said cover liner during raising of said cover, wherein a rear edge of said cover liner is lifted during raising of said cover, said linkage having a drag lever which swivels during raising of said cover, said drag lever being supported in a swivel bearing on the side of said vehicle roof and having a first bearing for connection with said cover and a second bearing for connection with said cover liner,
wherein said swivel bearing in said raised state of said cover lies below said first bearing and is mounted to a guide which moves said swivel bearing on the side of said vehicle roof upwards during raising said cover, and
wherein said guide for said swivel bearing is a bearing lever.

16. The vehicle roof according to claim 15, further comprising a roof-fixed longitudinal guide for horizontally shifting said cover and a movable carriage, said movable carriage being guided in said longitudinal guide, wherein said bearing lever is seated on said carriage and pivotally coupled to said carriage and is coupled to said drag lever through said swivel bearing.

17. A vehicle roof, comprising:
a roof opening;
a cover which can be raised and that can be arranged to close said roof opening;
a cover liner positioned underneath said cover; and
a linkage between said cover and said cover liner to couple said cover and said cover liner during raising said cover, and by which a rear edge of said cover liner is lifted during raising said cover, said linkage having a drag lever which swivels during raising said cover,
a swivel bearing that supports the drag lever on a side of said vehicle roof,
a first bearing for connection with said cover and a second bearing for connection with said cover liner,
a guide which moves said swivel bearing on the side of said vehicle roof upwards during raising said cover, wherein the swivel bearing lies below said first bearing when the cover is in a raised state,
a roof-fixed longitudinal guide for horizontally shifting said cover and a movable carriage, said movable carriage being guided in said longitudinal guide, wherein said guide for said swivel bearing is seated on said carriage, and
a stop disposed on said drag lever proximate to said second bearing for connection with said cover liner, wherein said stop rests on said longitudinal guide when said roof opening is closed.

18. The vehicle roof according to claim 17, wherein said stop rests on said longitudinal guide when said cover is in a closed position closing said roof opening.

19. A vehicle roof, comprising
a roof opening;
a cover which can be raised and that can be arranged to close said roof opening;
a cover liner positioned underneath said cover; and
a linkage between said cover and said cover liner to couple said cover and said cover liner during raising said cover, wherein a rear edge of said cover liner is lifted during raising said cover, said linkage having
a drag lever which swivels during raising of said cover,
a swivel bearing that supports the drag lever on a side of said vehicle roof,
a first bearing for connection with said cover and a second bearing for connection with said cover liner, a guide which moves said swivel bearing on the side of said vehicle roof upwards during raising said cover, wherein the swivel bearing lies below said first bearing when the cover is in a raised state, and wherein said drag lever is coupled to said cover by a connecting lever which is pivotally mounted to said drag lever by said first bearing and pivotally mounted to said cover.

20. The vehicle roof according to claim 19, wherein said guide is a bearing lever and said drag lever has two ends and extends substantially in horizontal direction when said roof opening is closed, one of said ends being engaged by said bearing lever which extends obliquely downwardly, and the other of said two ends being engaged by said connecting lever which extends obliquely upwardly.

21. The vehicle roof according to claim 19, further comprising a one-way stop which is connected with said cover and defines an angular position of said connecting lever relative to said cover when said cover is raised.

22. A vehicle roof, comprising a roof opening;

a cover which can be raised and that can be arranged to close said roof opening;

a cover liner positioned underneath said cover; and a linkage between said cover and said cover liner to couple said cover and said cover liner during raising said cover, and by which a rear edge of said cover liner is lifted during raising said cover, said linkage having a drag lever which swivels during raising of said cover, a swivel bearing that supports the drag lever on the side of said vehicle roof, a first bearing for connection with said cover and a second bearing for connection with said cover liner, a guide which moves said swivel bearing on the side of said vehicle roof upwards during raising said cover, wherein the swivel bearing lies below said first bearing when the cover is in a raised state, wherein said drag lever and said cover liner are connected by a slotted guide and having a guide pin, and wherein said slotted guide is formed by a C-shaped part which has a protrusion for stopping said guide pin, and wherein said C-shaped part is elastically deformable such that said guide pin can travel past said protrusion.

23. A vehicle roof, comprising a roof opening;

a cover which can be raised and that can be arranged to close said roof opening;

a cover liner positioned underneath said cover; and a linkage between said cover and said cover liner to couple said cover and said cover liner during raising said cover, and by which a rear edge of said cover liner is lifted during raising said cover, said linkage having a drag lever which swivels during raising of said cover, a swivel bearing that supports the drag lever on a side of said vehicle roof, a first bearing for connection with said cover and a second bearing for connection with said cover liner, a guide which moves said swivel bearing on the side of said vehicle roof upwards during raising said cover, wherein the swivel bearing lies below said first bearing when the cover is in a raised state, and wherein said drag lever and said cover liner are connected by a slotted guide having an ascending portion which lifts said rear edge of said cover liner out of said closed position when said cover begins horizontally shifting.

24. A vehicle roof, comprising:

a roof opening;

a cover which can be raised and that can be arranged to close said roof opening;

a cover liner positioned underneath said cover and having a forward and a rearward position, wherein said cover liner is arranged underneath said roof opening in said forward position; and a linkage between said cover and said cover liner to couple said cover and said cover liner during raising said cover, wherein a rear edge of said cover liner is lifted during raising said cover, said linkage having a drag lever which swivels during raising said cover, said drag lever being supported in a swivel bearing on the side of said vehicle roof and having a first bearing for connection with said cover and a second bearing for connection with said cover liner wherein said swivel bearing in said raised state of said cover lies below said first bearing and is mounted to a guide which moves said swivel bearing on the side of said vehicle roof upwards during raising said cover, wherein said drag lever and said cover liner are connected by a slotted guide, and wherein said slotted guide is mounted to said cover liner and further comprises a guide pin which is disengaged from said slotted guide when said cover liner is shifted.

* * * * *

UNITED STATES PATENT AND TRADEMARK OFFICE
CERTIFICATE OF CORRECTION

PATENT NO. : 6,676,204 B2
DATED : January 13, 2004
INVENTOR(S) : Weiss et al.

It is certified that error appears in the above-identified patent and that said Letters Patent is hereby corrected as shown below:

Column 7,
Line 32, insert -- guide is a bearing lever and said -- before "drag lever"
Line 34, "a" should be -- said --
Line 35, "downwards" should be -- downwardly --
Line 37, "upwards" should be -- upwardly --

Column 8,
Line 21, insert -- pivotally couple to said carriage and -- after "and" and before "is"

Signed and Sealed this

Sixth Day of April, 2004

JON W. DUDAS
*Acting Director of the United States Patent and Trademark Office*